(12) United States Patent
Hemingway et al.

(10) Patent No.: US 12,254,630 B2
(45) Date of Patent: Mar. 18, 2025

(54) MEDICAL IMAGE DATA PROCESSING APPARATUS AND METHOD

(71) Applicant: CANON MEDICAL SYSTEMS CORPORATION, Otawara (JP)

(72) Inventors: Ewan Hemingway, Edinburgh (GB); Rebecca Hall, Edinburgh (GB); Kamil Jacek, Edinburgh (GB)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 526 days.

(21) Appl. No.: 17/452,082

(22) Filed: Oct. 25, 2021

(65) Prior Publication Data
US 2023/0129056 A1 Apr. 27, 2023

(51) Int. Cl.
*G06T 7/11* (2017.01)
*G06T 7/00* (2017.01)
*G06T 7/33* (2017.01)

(52) U.S. Cl.
CPC .............. *G06T 7/11* (2017.01); *G06T 7/0012* (2013.01); *G06T 7/33* (2017.01); *G06T 2207/20021* (2013.01); *G06T 2207/20084* (2013.01); *G06T 2207/20128* (2013.01); *G06T 2207/30016* (2013.01)

(58) Field of Classification Search
CPC . G06T 7/11; G06T 7/0012; G06T 7/33; G06T 2207/20021; G06T 2207/20084; G06T 2207/20128; G06T 2207/30016; G06T 2207/10081; G06T 2207/10104; G06T 2207/10108; G06T 2207/10116; G06T 2207/10132
See application file for complete search history.

(56) References Cited

U.S. PATENT DOCUMENTS

| | | | | |
|---|---|---|---|---|
| 11,263,749 | B1* | 3/2022 | Purushottam | G16H 15/00 |
| 2018/0025512 | A1* | 1/2018 | Zhu | G06T 7/11 |
| | | | | 382/131 |
| 2019/0073780 | A1* | 3/2019 | Iwase | A61B 3/102 |
| 2019/0267132 | A1* | 8/2019 | Fuchigami | G06T 11/60 |
| 2021/0383534 | A1* | 12/2021 | Tadross | G06V 10/764 |
| 2022/0044365 | A1* | 2/2022 | Zhang | G06T 3/40 |
| 2023/0050141 | A1* | 2/2023 | Cooper | A61B 90/37 |

* cited by examiner

*Primary Examiner* — Dhaval V Patel
(74) *Attorney, Agent, or Firm* — Oblon, McClelland, Maier & Neustadt, L.L.P.

(57) ABSTRACT

A medical image data processing apparatus comprising processing circuitry configured to:
receive medical image data;
segment a body part included in the medical image data into multiple regions;
refine or constrain the segmentation based on at least one plane to obtain a segmentation that includes at least one boundary or other feature having a desired property.

20 Claims, 7 Drawing Sheets

MEDICAL IMAGE DATA PROCESSING APPARATUS AND METHOD

FIELD

Embodiments described herein relate generally to a medical image data processing apparatus and method, for example to provide segmentation of image data sets representing brains or other anatomical regions of interest.

BACKGROUND

It is known to perform registration and segmentation of medical image data for a variety of purposes. For some applications, it can be particularly important to ensure that anatomical regions, boundaries or other features are in accordance with expectations of a clinician or other user.

For assessment of strokes and ischemia, various metrics can be used to assess the severity of the condition. For example, the Alberta stroke programme early CT score (ASPECTS) is widely used to assign a score representing the severity of a stroke or other ischemic condition.

According to the ASPECTS approach, the following ten regions are identified, and a point is deducted from a score of 10 for each region where ischemia or other relevant anomaly is identified: i) caudate; ii) putamen; iii) internal capsule; iv) insular cortex; v) M1 (anterior MCA cortex); vi) M2 (MCA cortex lateral to insular ribbon); vii) M3 (posterior MCA cortex); viii) M4 (anterior MCA territory immediately superior to M1); ix) M5 (lateral MCA territory immediately superior to M2); and x) M6 (posterior MCA territory immediately superior to M3). The resulting score can be used to assess stroke severity, with a lower score indicating greater severity.

In order to segment images of a patient's brain to enable application of the ASPECTS scoring system, or for other purposes, it is known to perform a non-rigid registration procedure to register the images to an anatomical atlas.

While some ASPECTS regions are based on anatomical features (e.g. Caudate), some regions, or parts of a region, (e.g. M1-M6) are not directed to a specific imaging feature but have particular properties. For example, M1 to M3 are at the level of the basal ganglia, travelling inferiorly, and M4 to M6 should not appear in slices where basal ganglia structures appear. A horizontal plane is defined by where the basal ganglia end, which is a clinical definition. Vertical planes then divide M1 to M3 and M4 to M6.

If non-rigid registration is used then planar boundaries will often not be preserved, or not preserved in the expected or correct form, following the registration and/or transformation based on the registration. This can be apparent, for example, in the axial view for the axial separating plane between M1-M3 and M4-M6. This can look particularly anomalous with non-planar region divisions, because when non-curved planes are used generally there will be a clear boundary associated with a slice or between a pair of slices, whereas if the division is curved or non-planar, regions or parts of regions may pop in and out of view as a series of slices is viewed.

Even if planar structure is preserved in the registered and/or transformed image following the registration to the atlas, the precise clinical definition of M1-M3 and M4-M6, or other regions or features may not be respected in the registered and/or transformed image. In turn, this can undermine the confidence in the registered and/or transformed image and in an ASPECTS or other score or metric determined from such image. Clear and correct delineation of the ASPECTS regions in registered and/or transformed image data can be important for both clinician confidence and for reliability of scoring or other algorithms applied to the image data. Artifacts and/or unnatural boundaries that undermine confidence can potentially be present.

BRIEF DESCRIPTION OF THE DRAWINGS

Embodiments are now described, by way of non-limiting example, and are illustrated in the following figures, in which.

DETAILED DESCRIPTION

In certain embodiments there is provided a medical image data processing apparatus comprising processing circuitry configured to: receive medical image data; segment a body part included in the medical image data into multiple regions; refine or constrain the segmentation based on at least one plane to obtain a segmentation that includes at least one boundary or other feature having a desired property.

In certain embodiments there is provided a medical image data processing method that comprises: receiving medical image data; segmenting a body part included in the medical image data into multiple regions; and refining or constraining the segmentation based on at least one plane to obtain a segmentation that includes at least one boundary or other feature having a desired property.

In certain embodiments there is provided a non-transitory computer-readable medium storing instructions that are executable to: receive medical image data; segment a body part included in the medical image data into multiple regions; and refine or constrain the segmentation based on at least one plane to obtain a segmentation that includes at least one boundary or other feature having a desired property.

Figure 1:
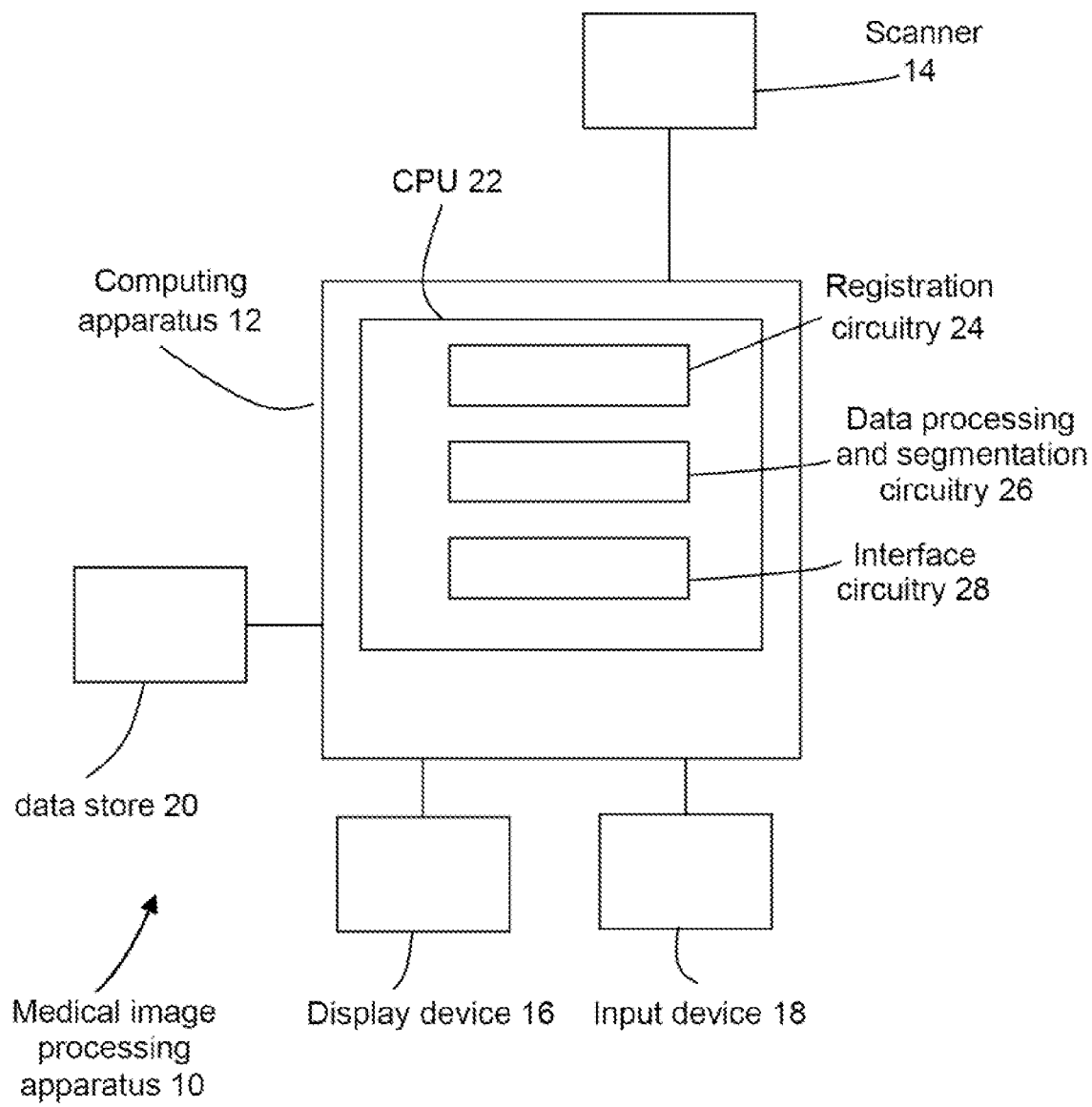
FIG. 1 is a schematic illustration of an apparatus in accordance with an embodiment.

A data processing apparatus 10 according to an embodiment is illustrated schematically in FIG. 1. In the present embodiment, the data processing apparatus 10 is configured to process medical image data.

The data processing apparatus 10 comprises a computing apparatus 12, which in this case is a personal computer (PC) or workstation. The computing apparatus 12 is connected to a display screen 16 or other display device, and an input device or devices 18, such as a computer keyboard and mouse.

The computing apparatus 12 is configured to obtain image data sets from a data store 20. The image data sets have been generated by processing data acquired by a scanner 14 and stored in the data store 20.

The scanner 14 is configured to generate medical image data, which may comprise two, three or four-dimensional data in any imaging modality. For example, the scanner 14 may comprise a magnetic resonance (MR or MRI) scanner, CT (computed tomography) scanner, cone-beam CT scanner, X-ray scanner, ultrasound scanner, PET (positron emission tomography) scanner or SPECT (single photon emission computed tomography) scanner. The medical imaging data may comprise or be associated with additional conditioning data, which may for example comprise non-imaging data.

The computing apparatus 12 may receive medical image data or other data from one or more further data stores (not shown) instead of or in addition to data store 20. For example, the computing apparatus 12 may receive medical image data from one or more remote data stores (not shown) which may form part of a Picture Archiving and Communication System (PACS) or other information system.

Computing apparatus 12 provides a processing resource for automatically or semi-automatically processing medical image data. Computing apparatus 12 comprises a processing apparatus 22. The processing apparatus 22 includes registration circuitry 24 that is configured to perform a registration process in accordance with any suitable registration procedure, for example any desired non-rigid registration procedure. The processing apparatus 22 also includes data processing and segmentation circuitry 26 configured to determine segmentations of body parts, for example based on a non-rigid registration, and/or to identify image and/or anatomical features, to apply constraints and determine boundaries, planes and/or other features, and/or to apply and/or determine scores or other metrics. The processing apparatus 22 also includes interface circuitry 28 configured to obtain user or other inputs and/or to output results, data and/or images.

In the present embodiment, the circuitries 24, 26, 28 are each implemented in computing apparatus 22 by means of a computer program having computer-readable instructions that are executable to perform the method of the embodiment. However, in other embodiments, the various circuitries may be implemented as one or more ASICs (application specific integrated circuits) or FPGAs (field programmable gate arrays).

The computing apparatus 22 also includes a hard drive and other components of a PC including RAM, ROM, a data bus, an operating system including various device drivers, and hardware devices including a graphics card. Such components are not shown in FIG. 1 for clarity.

The data processing apparatus 10 of FIG. 1 is configured to perform methods as illustrated and/or described in the following.

Figure 2:
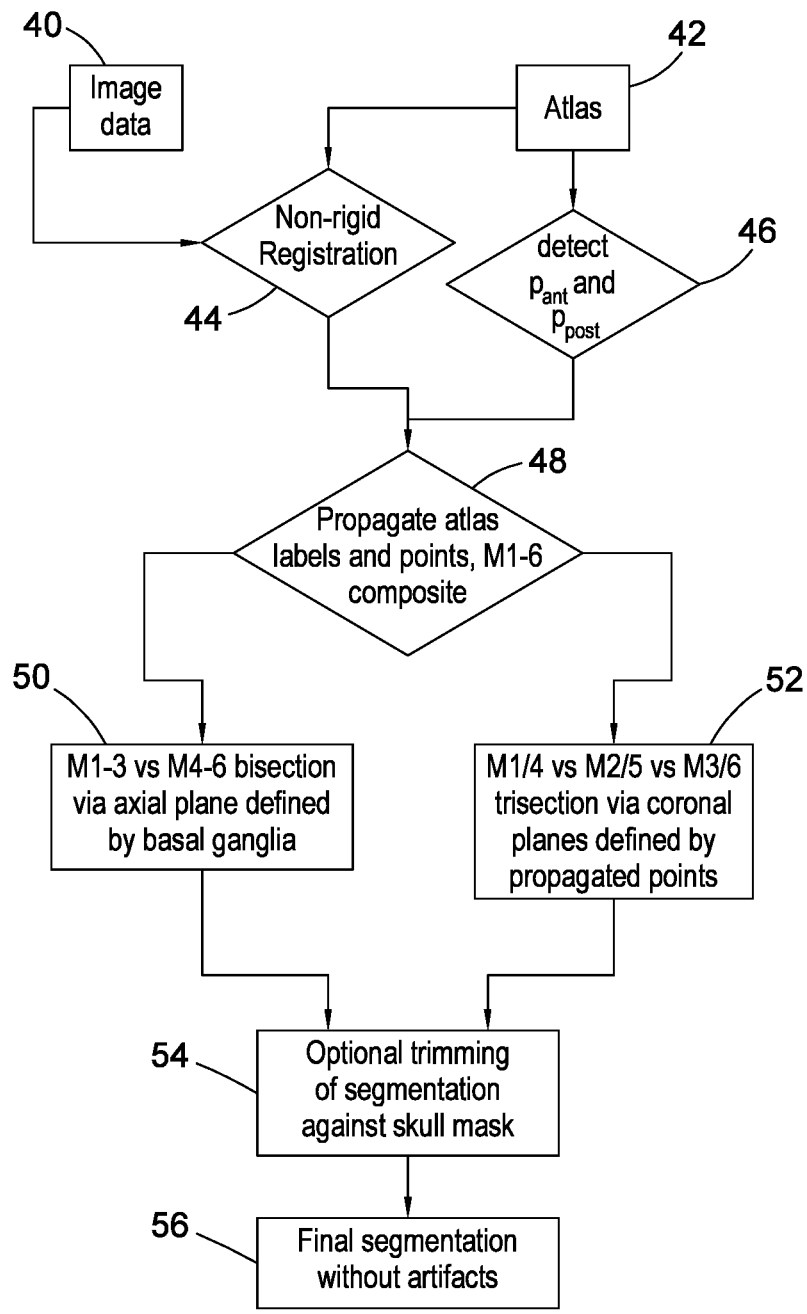
FIG. 2 is a flow chart illustrating in overview a method according to an embodiment.

A flow chart illustrating a method according to an embodiment is provided in FIG. 2. At a first stage 40, medical image data in the form of, for example, a medical image data set obtained by performing a CT scan on a patient or other subject is received by the registration circuitry 24, either directly from scanner 14 or from data store 20. Atlas data is also obtained by the registration circuitry 24 at stage 42, for example from the data store. In the present embodiment the scan data is CT data representing the brain of the patient, and the atlas data includes data identifying points and/or regions in the brain.

Any suitable atlas data may be used. For example the atlas data may comprise a set of image data (for example either a measured data set, an average or other combination of measured data sets, or one or more synthesized data sets) and associated labels that identify features and/or regions of interest.

At stage 44, the registration circuitry 24 performs a non-rigid registration process that registers the image data and the atlas data. In accordance with usual registration procedures anatomical features in the image data if transformed in accordance with the registration will usually be aligned with corresponding features in the atlas in a common co-ordinate space. Anatomical features and/or regions are labelled in the atlas data set and the labels can be used to identify corresponding features and/or regions in the image data set, thereby enabling segmentation of features in the image data set. Any suitable non-rigid registration process to an atlas may be used to obtain the registration.

In the present embodiment, before the registration there may also be an optional alignment such that a volumetric space of the image data set is aligned contralaterally and to a radiographic baseline, e.g. the orbitomeatal (OM) baseline. The OM line is an anatomically defined line between landmarks. The alignment can be performed to a radiographic standard such that a symmetry plane is along the Y axis, resulting in a corrected pose. The alignment produces a set of X, Y, Z vectors that provides a basis. The alignment of the volumetric space of the image data set can include a resampling or reformatting so that voxels are aligned with a coordinate space.

Once resampled or reformatted, planes can be aligned with voxels. The atlas may already be aligned or may also be subject to an alignment procedure.

Figure 3A:
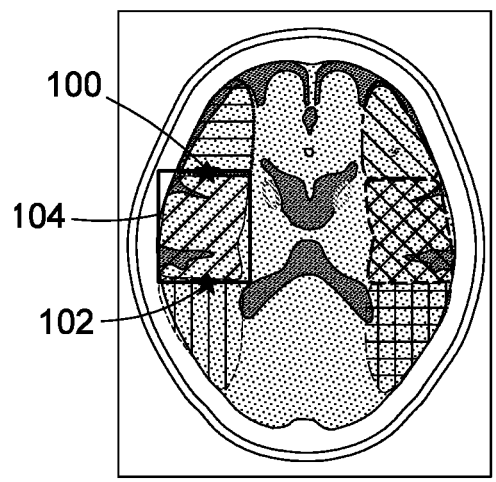
FIGS. 3A to 3C show slice images of a brain at different stages of processing image data according to the method of FIG. 2.

At stage 46, a bounding cube for a central M region in the atlas data set is determined. The position of middle planar points of anterior and posterior faces of the bounding cube are then determined. These points are referred to as $p_{ant}$ and $p_{post}$. The bounding cube 104 and the points $p_{ant}$ and $p_{post}$ 100 and 102 are shown in FIG. 3A, which is a slice image of a brain.

Figure 3B:
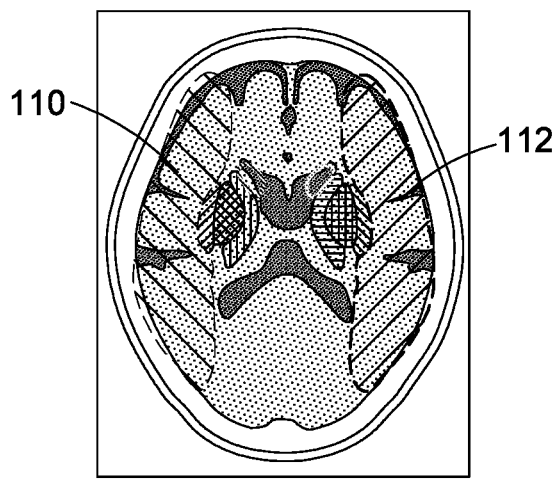

At the next stage 48, for each of the left and right hemispheres, the M1 to M6 regions as labelled in the atlas data set are combined, to obtain a composite M region for the left hemisphere and a composite M region for the right hemisphere. The composite M regions for the left and right hemispheres are indicated in FIG. 3B as features 110 and 112, where FIG. 3B is a further slice image of the brain of FIG. 3A.

The atlas labels for the composite regions, and points $p_{ant}$ and $p_{post}$, are propagated to the image data set by transforming the co-ordinates associated with those labels and points in the co-ordinate space of the atlas data set to the co-ordinate space of the image data set using the registration.

The points $p_{ant}$ and $p_{post}$ and, for example, the composite M regions for the left hemisphere and the right hemisphere are transformed in accordance with the non-rigid registration thereby to identify the points and the composite M regions in the image data set. In some embodiments, only points are transformed, rather than or in place of a face or surface that would be warped or otherwise distorted by the non-rigid registration. In alternative embodiments any other suitable features, as well as instead of points, that would not distorted (for example, for which geometrical and morphological property(s) would not change) by a transformation in accordance with the non-rigid registration may be used, and the transformed points or other features may then be used in determining plane, for example as described further below.

In the present embodiment, the region that is propagated (e.g. identified in the image data set based on labels in the atlas data set and registration of atlas and image data sets) from the atlas to the image data set of the patient or other subject is a composite region. The individual atlas regions M1 to M6 are not propagated individually in accordance with the registration in this embodiment, although such propagation of individual regions may be provided in alternative embodiments.

After the propagation, at stages 50 and 52 the composite M regions are divided into the individual M1 to M6 regions for both left and right hemispheres using the propagated points $p_{ant}$ and $p_{post}$, for example using plane(s) determined from the points. In particular, the data processing and segmentation circuitry 26 detects an axial plane immediately superior to the basal ganglia (according to segmentation achieved using the registered atlas data set) and bisects each composite M region with a plane. This plane's normal, $\hat{n}_{axial}$ may effectively be defined as the cross product of the OM line & contralateral normal $\hat{n}_{contra}$. The bisection is used to divide the composite M region into a combined M1 to M3 region and a combined M4 to M6 region A transformation in accordance with the non-rigid registration is applied to $p_{ant}$ and $p_{post}$ to obtain $\hat{p}_{ant}$, $\hat{p}_{post}$ which are the points after being subject to the transformation. The data processing and segmentation circuitry 26 then creates two coronal planes at $\hat{p}_{ant}$, $\hat{p}_{post}$ where normal is cross-product of $\hat{n}_{axial}$ and $\hat{n}_{contra}$ and trisects the composite M regions at each plane to obtain the individual M1 and M4 regions, M2 and M5 regions, and M3 and M6 regions for each of the left and right hemispheres. Thus, a segmentation of, for example, composite regions such as the left and right M regions are refined based on the plane(s) that are determined. The regions can be obtained for only one of the hemispheres if desired.

At the next stage 54, there is optional trimming or other adjustment of the segmentations so that they match a skull mask, or any other desired refinements of the segmentations. The final segmentation is then output at stage 56.

In some embodiments, the output e.g. at stage 56 comprises one or more images obtained from the image data set and displayed to a clinician or other user with the segmentations of any or all of the M1 to M10 regions or features overlaid, or otherwise displayed. For example one or more slice images may be displayed for any desired sections through the brain or other region and in any desired direction, for example axial, coronal or sagittal directions.

It is a feature of the embodiment that as at least some planes or lines (for example straight lines and flat or non-curved planes relevant to the segmentations) are determined after non-rigid registration of points used in determining the planes or lines, the planes or lines themselves are not distorted away from their expected (e.g. flat or straight line) form by the non-rigid registration, and so the segmentations have a form that is in accordance with the expectations of a clinician or other user. The clinician or other user may subsequently use the segmentations to determine an ASPECTS score or other metric or output, for example by determining which if any segmented regions or features include ischemic features or other relevant anomalous features.

Figure 3C:
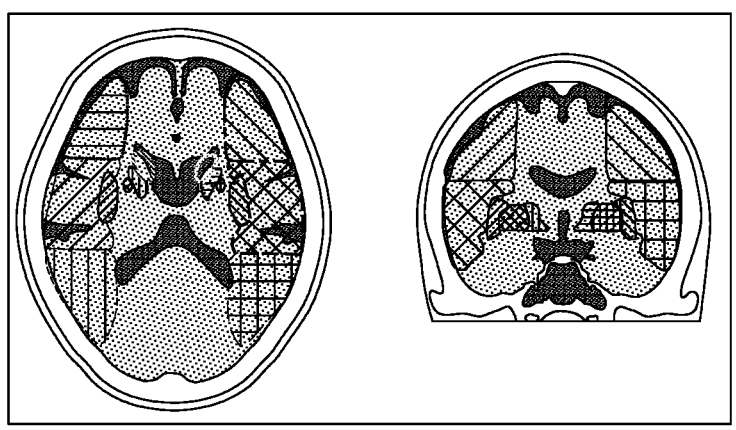

FIG. 3C shows further slice images, from two orthogonal directions, of the brain of FIGS. 3A and 3B, after segmentation using the embodiment of FIG. 2, with different M regions indicated by different shading and boundaries of different M regions indicated by different line styles. The boundary lines are straight at boundaries between those M regions where a clinician would expect to see straight or flat boundaries.

Figure 4:
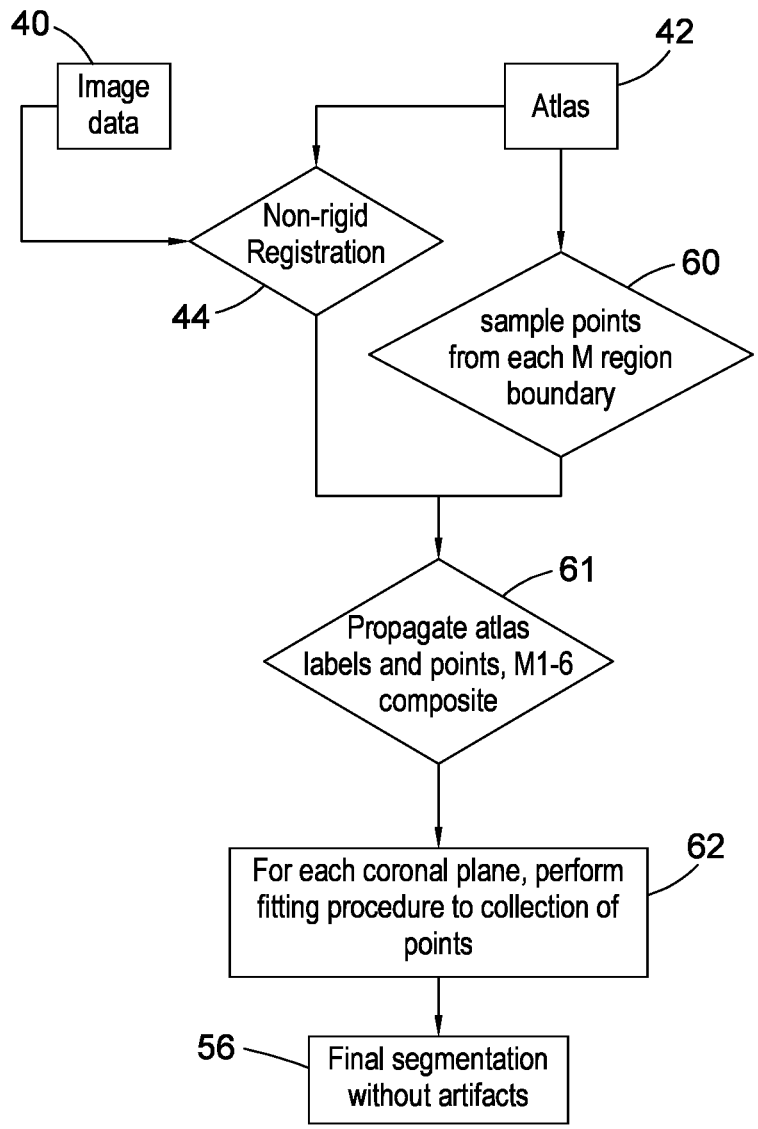
FIG. 4 is a flow chart illustrating in overview a method according to an embodiment.

A method according to an alternative embodiment, which may be performed by the apparatus of FIG. 1 is illustrated in overview in the flowchart of FIG. 4.

Like reference numerals are used for like features and stages 40, 42 and 44 are the same or similar to those stages described in relation to FIG. 1, and include obtaining of image data set and atlas data and performance of non-rigid registration, and alignment to OM line or other baseline, and optionally reformatting or resampling.

In the embodiment of FIG. 4, at stage 60, N points on the boundaries of or between each desired M region or pairs or other combinations of adjoining M regions, e.g. $m_{M1-2} = \{p_1, p_2, \ldots, P_N\}$, are found and sampled in the atlas data, based on labels of at least the M1 to M6 regions included with the atlas data. For example, points on boundaries of any of M1 to M6 regions, or points at or representing any other desired regions, may be sampled.

At stage 61, atlas labels and points are propagated to the image data set by transforming the co-ordinates associated with those labels and points in the co-ordinate space of the atlas data set to the co-ordinate space of the image data set using the registration, in similar fashion to that described in relation to stage 48 of the embodiment of FIG. 2. However, at stage 61 the points that are propagated to the image data set co-ordinate space are the M region boundary points sampled at stage 60. As in the embodiment of FIG. 2, for each of the left and right hemispheres, the M1 to M6 regions as labelled in the atlas data are combined, to obtain a composite M region for the left hemisphere and a composite M region for the right hemisphere, and the composite M regions are also propagated to the image data set at stage 61.

At the next stage 62, a fitting process, also referred to as a fitting procedure, is performed in respect of the boundary points to obtain each coronal plane for the image data set, thereby splitting the composite M region for each of the left and right hemispheres. In particular, for each (non-axial) boundary between two adjacent M regions, the non-rigid registration transform is applied to the set of sampled points from that boundary, i.e. $m_{M1-2} \rightarrow \hat{m}_{M1-2}$ at stage 61, and then at stage 62, the data processing and segmentation circuitry 26 applies a fitting procedure (e.g. least squares fitting, or any other desired fitting procedure) to find the plane of best fit for each set of points (e.g. $\hat{m}_{M1-2}$) thereby to define planar boundaries between M regions (e.g. between any or all of regions M1 to M6). The composite M regions for the left and right hemispheres are then split according to these best fit planes. An axial plane may be determined from the basal ganglia, for example as described in relation to FIG. 2.

The fitting in the embodiment is such as to ensure that the boundaries of and/or between regions, e.g. regions M1 to M6, have a form expected by a clinician or other user, for example have straight lines and/or flat or non-curved planes where appropriate.

At stage 56, as with the embodiment of FIG. 2, output is provided for example in the form of image(s) with one or more of the M1-M10 segmentations, or any other segmentations, overlaid or otherwise represented to a user.

As with other the other described embodiments, the clinician or other user may subsequently use the segmentations to determine an ASPECTs score or other metric or output, for example by determining which if any segmented regions or features include pathologies or other anomalous features.

Figure 5:
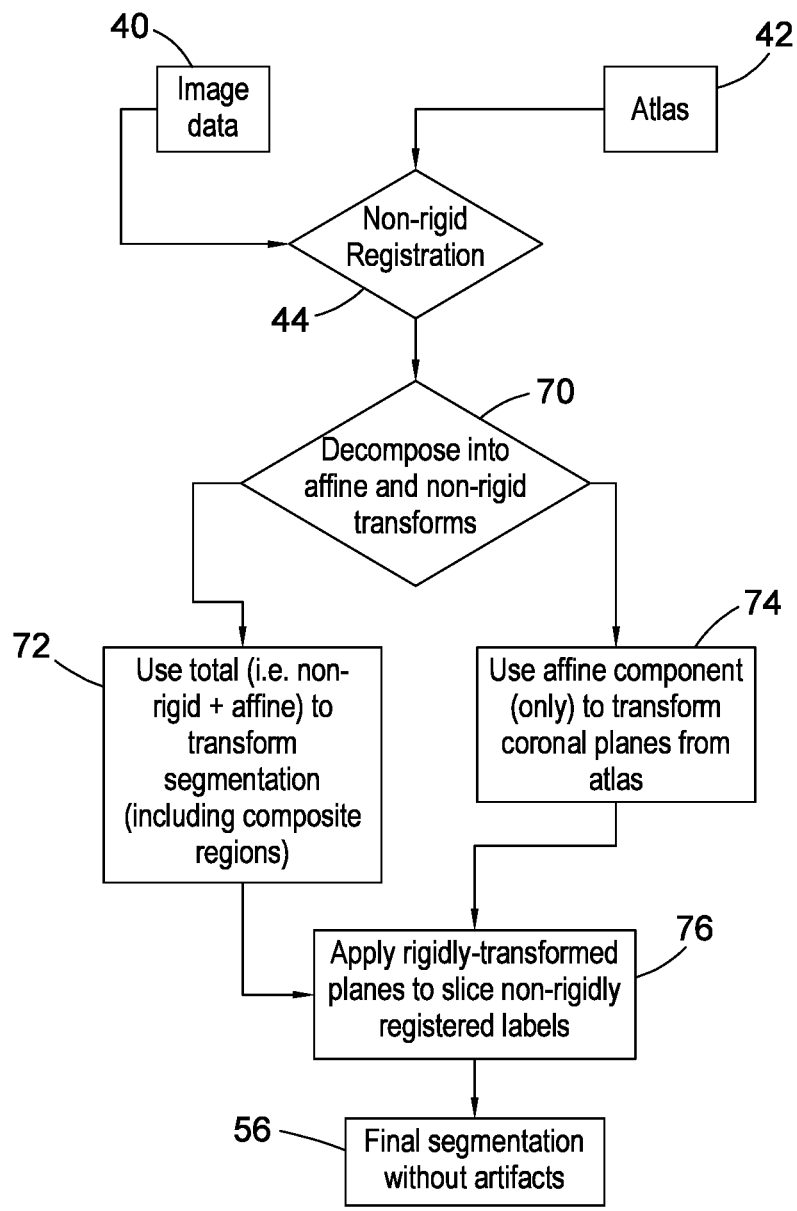
FIG. 5 is a flow chart illustrating in overview a method according to an embodiment.

A method according to an alternative embodiment, which may be performed by the apparatus of FIG. 1 is illustrated in overview in the flowchart of FIG. 5.

Like reference numerals are used for like features and stages 40, 42 and 44 are the same or similar to those stages described in relation to FIG. 2, and include obtaining of image data and atlas data, for example an image data set and an atlas data set, and performance of non-rigid registration, and alignment to OM line or other baseline, and optionally reformatting or resampling as described in relation to FIG. 2.

As in the embodiment of FIG. 2, for each of the left and right hemispheres the M1 to M6 regions as labelled in the atlas data set are combined, to obtain a composite M region for the left hemisphere and a composite M region for the right hemisphere.

At the next stage, 70, the data processing and segmentation circuitry 26 decomposes the transformation obtained from the non-rigid registration process at stage 44 into affine or rigid components and remaining non-rigid components that together provide the transformation obtained from stage 44.

At stage 72 the overall non-rigid registration obtained at stage 44 is used to perform a transformation (corresponding to the combination of non-rigid and affine transformations determined at stage 70) to transform segmentation labels from the atlas data set into the co-ordinate space of the image data set. The transformation includes a transformation of the composite left and right M regions determined for the atlas data set. An axial plane is determined based on the transformed location of the basal ganglia, for example as described in relation to FIG. 2.

At stage 74, the affine or rigid transformation determined at stage 70 is used to transform coronal planes of the atlas data set into the co-ordinate space of the image data set. For each (non-axial) boundary between each two adjacent M regions, the affine transformation component is applied only to plane parameters of that boundary. Because the transformation is affine the geometry of planes will be preserved, for example flat or non-curved planes will remain flat or non-curved after the affine transformation.

At the next stage, 76, the transformed planes obtained at stage 74 are used to split labelled regions or other features, for example the composite M regions, in the image data set, resulting in a segmented image data set including, for example, M1 to M10 regions or other features, and which is output at stage 56. The segmented regions will be in a form expected by a clinician or other user as the shape of the lines or planes is preserved by the affine or rigid transformation at stage 74.

Figure 6:
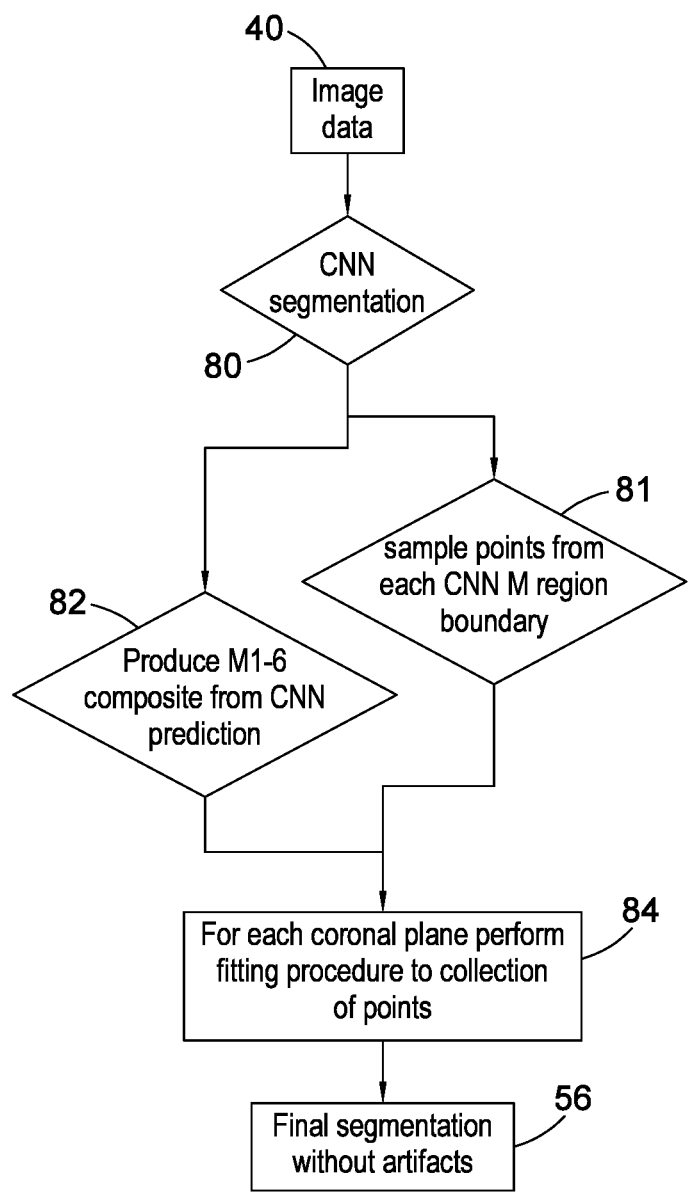
FIG. 6 is a flow chart illustrating in overview a method according to an embodiment.

A method according to an alternative embodiment, which may be performed by a variant of the apparatus of FIG. 1 is illustrated in overview in the flowchart of FIG. 6. In the variant of the embodiment of FIG. 1, the registration circuitry 24 is not included or not used, and the data processing and segmentation circuitry 24 comprises a trained model that it is configured to apply to image data to obtain segmentations.

At stage 40, image data in the form of, for example, an image data set obtained by performing a CT or other scan on a patient is obtained by the processing apparatus 22, either directly from scanner 14 or from data store 20.

As with other embodiments, there may also be an optional reformatting such that a volumetric space of the image data set is aligned contralaterally and to a radiographic baseline, e.g. the orbitomeatal (OM) baseline.

At the next stage, 80, a trained convolutional neural network (CNN) or other model is applied to the image data set to obtain a segmentation of regions or features of interest, for example regions or features M1 to M10. Any suitable trained model may be used and may be trained in supervised, semi-supervised or unsupervised fashion, on a plurality of training data sets.

The segmentations that are produced as an output by application of the model at stage 80 will not usually have straight line or flat or non-curved planar boundaries between segmented regions, contrary to what may be expected by a clinician or other user for the boundaries between at least some of the M1 to M6 regions.

At stage 81, N points on the boundaries of or between each desired M region or pairs or other combinations of adjoining M regions, e.g. $m_{M1\text{-}2} = \{p_1, p_2, \ldots, p_N\}$, are found and sampled from the segmentations produced by the trained model at stage 80. For example, points on boundaries of any of M1 to M6 regions, or points at or representing any other desired regions, may be sampled. This is similar to the sampling at stage 60 of the embodiment of FIG. 4, but performed on the segmentation outputs of the CNN or other model rather than being performed on a labelled atlas data set.

At stage 82, the segmentations of the M1 to M6 regions obtained by the trained model at stage 80 (e.g. the prediction by the trained CNN of where the M1 to M6 regions are) for each of the left and right hemispheres are combined, to obtain a composite M region for the left hemisphere and a composite M region for the right hemisphere.

At stage 84, a fitting procedure is performed by the data processing and segmentation circuitry 26 in respect of the boundary points obtained by the sampling process at stage 81 to obtain each coronal plane for the image data set, thereby splitting the composite M region for each of the left and right hemispheres. In particular, for each (non-axial) boundary between two adjacent M regions, the data processing and segmentation circuitry 26 applies a fitting procedure (e.g. least squares fitting, or any other desired fitting procedure) to find the plane of best fit for each set of points (e.g. $\hat{m}_{M1\text{-}2}$) thereby to define planar boundaries between M regions (e.g. between any or all of regions M1 to M6) and the composite M regions for the left and right hemispheres are then split according to these best fit planes. An axial plane may be determined from the basal ganglia, for example as described in relation to FIG. 2. The procedure is the same or similar to that of stage 62 of the embodiment of FIG. 4, but performed on points obtained by sampling a segmentation output from the CNN or other trained model.

The resulting segmented image data set including, for example, M1 to M10 regions or features, or any other desired regions or other features, is then output at stage 56, for example in the same or similar manner as for the other described embodiments.

In a variant of the embodiment of FIG. 6, as well as or instead of fitting boundary or other points at stage 84 to obtain straight or non-curved or other desired shape of boundaries or other features, such desired shapes of boundaries or other features may be obtained by including a loss function or other constraint as part of the CNN or other model.

Figure 7:
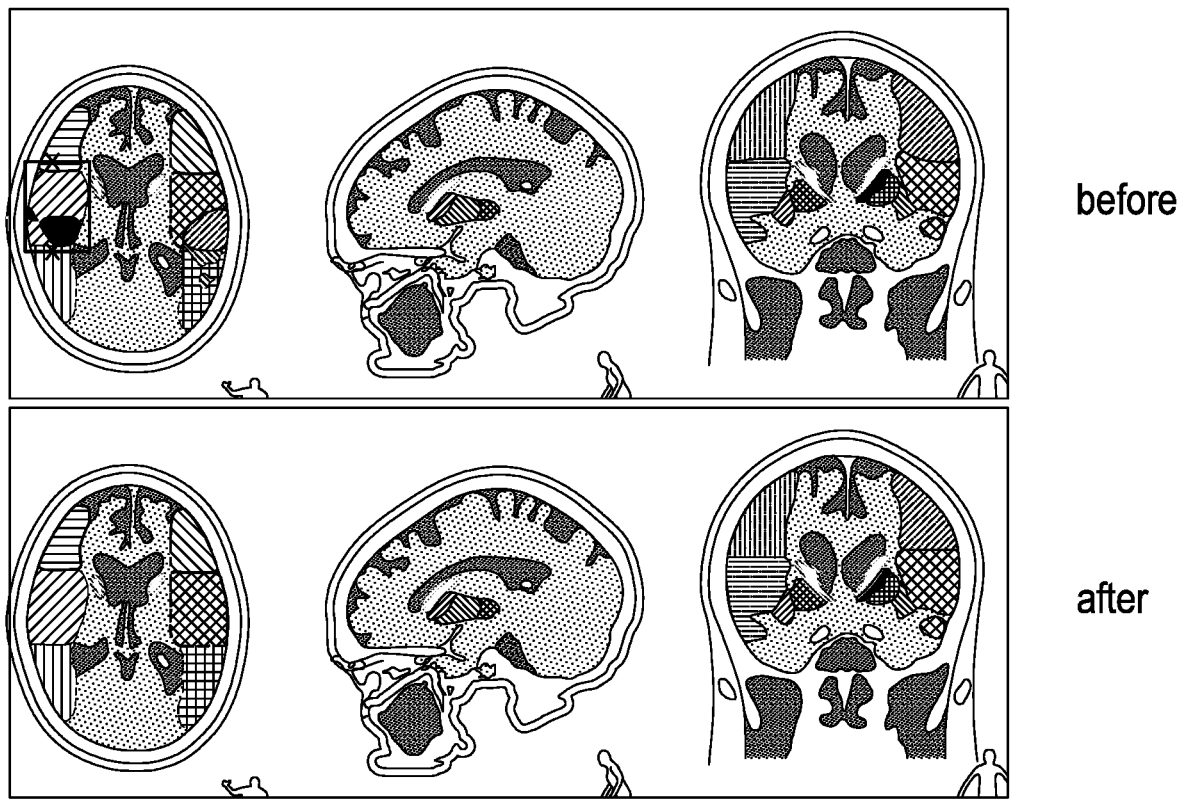
FIG. 7 shows slice images of a brain before and after refinement of a segmentation in accordance with an embodiment.

Returning to the embodiment of FIG. 2, FIG. 7 shows slice images, from three orthogonal directions, of a brain with boundaries of different M regions determined by segmentation based on non-rigid registration obtained using the embodiment of FIG. 2. Different M regions are indicated using different shading and boundaries are indicated using different line styles. The top three images show segmentations after non-rigid registration but before refinement using the determined planes. The bottom three images show the segmentations after refinement using the determined planes. In the bottom images, it can be seen that some boundaries that were curved before the refinement are now straight. In particular, in the bottom images the boundary lines are straight at boundaries between those M regions where a clinician would expect to see straight or flat boundaries.

Although embodiments have been described in which one or both hemispheres of a brain are segmented, any other suitable body part, for example any suitable anatomical feature, may be segmented partially or wholly in alternative embodiments.

Although refinement or constraint of a segmentation based on at least one plane has been described in order to ensure that at least one boundary, for example one or more boundaries of ASPECTS regions, are planar and/or non-curved in other embodiments any other boundary or other feature may be refined or constrained to have any suitable desired property(s), for example desired geometrical or morphological property(s).

Certain embodiments provide a medical image processing apparatus comprising processing circuitry configured to: receive one or more volumes; correctly preserve planar boundaries in a segmentation of said volumes in locations where clinically expected.

The segmentation method may be atlas-based segmentation involving non-rigid registration between atlas and said volumes. The atlas segmentation may contain ASPECTs (Alberta stroke programme early CT score) regions and the images to be registered may be NCCT (non-contrast computed tomography).

Left and right composite segmentations of the M regions may be produced to be later split by planes representative of the original boundaries. The planes may be determined by applying the registration transform to a single point representing the plane and where the plane normal is implicit from the image orientation.

The axial bisecting plane may be determined from the most superior point of the basal ganglia.

The planes may be determined by applying the registration transform to a collection of points sampled from the original plane. The transformed points may be reconstructed by best fit to form a transformed plane.

The planes may be determined by decomposing the registration transform to affine and non-affine components. The original plane parameters may be transformed using the affine part only.

A mask of the skull may be used to remove any ASPECTs region voxels that overlap with the skull.

The atlas segmentation may contain ASPECTs regions and the images to be registered may be MRI (magnetic resonance imaging), CTP (computed tomography perfusion) or some other suitable modality.

The segmentation may be provided by a CNN (convolutional neural network). The planes may be straightened as a post-processing step via a best fit procedure.

Certain embodiments provide a medical image processing apparatus comprising processing circuitry configured to: receive medical image data, segment a body part of included in the medical image data into multiple regions by non-rigid registration based on atlas, correct the segmented multiple regions based on a plane set by at least one of the atlas or the medical image data.

Certain embodiments provide a method comprising: obtaining a volumetric imaging data set that is representative of a brain of a patient; performing a segmentation process to obtain an initial segmentation of a plurality of regions in the volumetric imaging data set, wherein the regions are regions used to determine ASPECTs score (Alberta Stroke Program Early CT score); performing a plane determining process to determine planes separating at least some of the regions, wherein the plane determining process comprises applying at least one anatomical and/or geometrical constraint to the determined planes; and updating the initial segmentation using the determined planes.

The volumetric imaging data set may comprise NCCT (non-contrast CT) data.

The segmentation method may comprise an atlas-based segmentation comprising a non-rigid registration between an atlas and the volumetric imaging data set.

The plane determining process may comprise compositing initial segmentations of left M1, M2, M3, M4, M5 and M6 ASPECTs regions to obtain a combined left M region, and compositing initial segmentations of right M1, M2, M3, M4, M5 and M6 ASPECTs regions to obtain a combined right M region.

The updating of the initial segmentation may comprise applying the determined planes to split the combined left region into updated left M1, M2, M3, M4, M5 and M6 ASPECTS regions and to split the combined right region into right M1, M2, M3, M4, M5 and M6 ASPECTs regions.

The plane determining process may comprise: locating in the volumetric imaging data set a single point to be used in determining a plane; applying a registration transform obtained from the non-rigid registration to the single point; and determining a plane through the single point, wherein a normal to the plane is determined from an orientation of the volumetric imaging data set.

The method may further comprise locating an orbitomeatal line within the volumetric imaging data set and aligning the volumetric imaging data set using the orbitomeatal line.

The method may further comprise aligning the volumetric imaging data set contralaterally.

The plane determining process may comprise locating a most superior point of the basal ganglia, and determining an axial plane using the location of the most superior point of the basal ganglia.

The plane determining process may comprise: determining a plurality of points on a boundary between regions obtained in the initial segmentation; applying a registration transform obtained from the non-rigid registration to the plurality of points; and applying a fitting process to the transformed points to obtain a plane.

The plane determining process may comprise: decomposing a registration transform obtained from the non-rigid registration into an affine component and a non-affine component; and using the affine component to transform a boundary between regions obtained from the initial segmentation.

The method may further comprise obtaining a mask of a skull of the patient and applying the mask of the skull to the volumetric imaging data set to remove any ASPECTs region voxels that overlap with the skull.

The volumetric imaging data set may comprise at least one of MRI (magnetic resonance imaging) data, CTP (computed tomography perfusion) data.

The segmentation process may comprise applying a trained model to the volumetric imaging data set, optionally wherein the trained model is a CNN (convolutional neural network).

The plane determining process may comprise determining a plurality of points on a boundary between regions obtained in the initial segmentation; and applying a fitting process to the transformed points to obtain a plane.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments are described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical image data processing apparatus comprising processing circuitry configured to:
    receive medical image data;
    segment a body part included in the medical image data into multiple regions; and
    refine or constrain the segmentation based on at least one plane to obtain a segmentation that includes at least one boundary or other feature having a desired property,
    wherein the refining or constraining of the segmentation comprises preserving a desired geometry of the at least one boundary or other feature to be flat or non-curved after obtaining the segmentation.

2. The apparatus of claim 1, wherein the processing circuitry is configured to segment the body part based on a non-rigid registration between the medical image data and atlas data.

3. The apparatus of claim 2, wherein the processing circuitry is configured to transform in accordance with the non-rigid registration at least one point or other feature that is not distorted by the non-rigid registration, and to determine the at least one plane from said at least one point or other feature.

4. The apparatus of claim 1, wherein the processing circuitry is configured to determine a plurality of points on at least one boundary between regions and to apply a fitting process to the points to determine the at least one plane.

5. The apparatus of claim 4, wherein the processing circuitry is configured to determine the plurality of points from atlas data, to transform the plurality of points in accordance with a registration between the atlas data and the medical image data, and to apply the fitting process to the points after the transformation.

6. The apparatus of claim 1, wherein the processing circuitry is configured to form a composite region and the refining of the segmentation comprises dividing the composite region into the multiple regions.

7. The apparatus of claim 6, wherein the processing circuitry is configured to:
    form the composite region based on atlas data; and
    transform the composite region in accordance with a registration between the atlas data and the medical image data, wherein
    the dividing of the composite region into the multiple regions is performed on the transformed composite region.

8. The apparatus of claim 6, wherein the dividing of the composite region comprises dividing the composite region using the at least one plane.

9. The apparatus of claim 2, wherein the processing circuitry is configured to:
    decompose a registration transform obtained from the non-rigid registration into an affine or rigid component and a non-affine component; and
    use the affine or rigid component to transform a boundary between regions.

10. The apparatus of claim 1, wherein the at least one plane includes an axial plane and the processing circuitry is configured to determine the axial plane based on a position of a basal ganglia.

11. The apparatus of claim 1, wherein the processing circuitry is configured to apply a convolutional neural network (CNN) or other trained model to the medical image data to segment the body part, and the constraining of the segmentation comprises including a loss function or other constraint based on the at least one plane in the CNN or other trained model.

12. The apparatus of claim 11, wherein the at least one plane comprises or represents at least one boundary between or of the regions.

13. The apparatus of claim 1, wherein the at least one desired property of the boundary or other feature comprises a a flat or non-curved shape.

14. The apparatus of claim 1, wherein the body part comprises a brain or at least one hemisphere or other part of a brain.

15. The apparatus of claim 1, wherein the regions comprises any or all of M1 to M6 regions, or M1 to M10 regions, or other regions of the Alberta Stroke Program Early CT score (ASPECTS) scheme.

16. The apparatus of claim 6, wherein the composite region comprises some or all of M1 to M6 regions of the ASPECTS scheme.

17. The apparatus of claim 1, wherein the processing circuitry is configured to:
    a) determine an orbitomeatal line from the medical image data and aligning the medical image data using the orbitomeatal line; and/or
    b) align the medical image data contralaterally.

18. The apparatus of claim 1, wherein the medical image data comprises at least one of magnetic resonance imaging (MRI) data, computed tomography (CT) data, cone-beam CT data, non-contrast CT (NCCT) data, computed tomography perfusion (CTP) data, X-ray data, ultrasound data, positron emission tomography (PET) data or single photon emission computed tomography (SPECT) data.

19. A medical image data processing method comprising:
    receiving medical image data;
    segmenting a body part included in the medical image data into multiple regions; and
    refining or constraining the segmentation based on at least one plane to obtain a segmentation that includes at least one boundary or other feature having a desired property,
    wherein the refining or constraining of the segmentation comprises preserving a desired geometry of the at least one boundary or other feature to be flat or non-curved after obtaining the segmentation.

20. A non-transitory computer-readable medium storing instructions that are executable to:
    receive medical image data;
    segment a body part included in the medical image data into multiple regions; and
    refine or constrain the segmentation based on at least one plane to obtain a segmentation that includes at least one boundary or other feature having a desired property, wherein the refining or constraining of the segmentation comprises preserving a desired geometry of the at least one boundary or other feature to be flat or non-curved after obtaining the segmentation.

* * * * *